2,701,782

METHOD OF MAKING AND AQUEOUS SUSPENSION OF METHYL CELLULOSE

Samuel H. Culter, Kalamazoo, Mich., assignor to The Upjohn Company, Kalamazoo, Mich., a corporation of Michigan No Drawing. Application May 11, 1951,
Serial No. 225,920

12 Claims. (Cl. 167—56)

This invention relates to aqueous suspensions of methyl cellulose, said suspensions having a substantially lower viscosity than aqueous colloidal solutions having the same amount of methyl cellulose per unit volume and to a method for their preparation.

The methyl cellulose of commerce, used in the process and products described herein, is a partially depolymerized, or hydrolyzed, cellulose containing about two methoxyl groups for each glucose unit which has, depending upon the degree of hydrolysis of the cellulose, an average molecular weight of between 30,000 and about 150,000. It is miscible with water in all proportions, forming colloidal solutions which vary from thin demulcent liquids to soft gels. Two percent water solutions of methyl cellulose have viscosities which vary between about fifteen centipoises to about 4000 centipoises. The numerical values of the viscosity of the two percent solutions are used in commerce to classify the various types of product available in a manner which is indicative of the average molecular weight.

Methyl cellulose has been found to be useful in therapy as a bulk laxative when taken orally as it is a hydrophilic colloid which is non-toxic, non-absorbed by the intestinal mucosa, not degraded by intestinal enzymes and is non-antigenic. It is a chemically uniform product and in this respect has an advantage over the natural gums used as bulk laxatives. For therapeutic purposes, methyl cellulose has not been administered in other than the solid, dry, form. Aqueous solutions containing sufficient methyl cellulose of any viscosity grade in a small enough volume to be useful, such as a ten to twenty percent solution, are so viscous as to render their oral administration so extremely difficult and unpleasant as to be considered impossible from any practical standpoint. Aqueous suspensions of methyl cellulose containing at least one part of water for each part of methyl cellulose were not known prior to the present invention.

It is an object of this invention to prepare an aqueous methyl cellulose product containing undissolved methyl cellulose having a water to methyl cellulose ratio of at least one. It is a further object of this invention to prepare an aqueous methyl cellulose product whose viscosity is substantially less than that of an aqueous colloidal solution having the same amount of methyl cellulose per unit of volume. It is also an object of this invention to provide a method for decreasing the solubility of methyl cellulose in water without gel formation. An additional object is the provision of an aqueous methyl cellulose suspension that is suitable for use as an oral therapeutic preparation. Another object is the provision of a fluid aqueous suspension of methyl cellulose that can be used as a medicinal vehicle in which additional ingredients can be incorporated.

The objects of this invention have been accomplished by mixing finely divided methyl cellulose and an aqueous sugar solution of at least a certain minimum sugar concentration as is hereinafter more fully described. The solubility of methyl cellulose in such suitable syrups has been found to be so greatly reduced that undissolved solid methyl cellulose can exist in contact with the aqueous solution without gel formation. The viscosities of the suspensions of this invention are much less than would be predicted on the basis of the quantities of methyl cellulose and water present per unit of volume. In many modifications of this invention the vicosity of a suspension containing twenty percent weight/volume of methyl cellulose is below that of a two percent colloidal water solution.

Further, dilution with water of the methyl cellulose suspensions of this invention causes their viscosities to change in an unusual and characteristic manner which differs significantly from the behavior on dilution with water of the previously known colloidal solutions of methyl cellulose. The portionwise addition of water to the suspensions of this invention causes a relatively minor change in their viscosities until the sugar concentration of the suspension reaches the prescribed minimum. When this minimum sugar concentration is reached the addition of more water results in a rapid increase in the viscosity which reaches a maximum when the amount of water added effects a complete colloidal solution. When complete solution of the methyl cellulose has been achieved the addition of still more water results in a decrease in the viscosity, the amount of the decrease being related to the quantity of water added. This behavior on dilution with water of the suspensions of this invention is in sharp contrast to that of the previously known colloidal solutions of methyl cellulose whose viscosities decrease immediately upon the addition thereto of water.

Syrups which are suitable for use in preparing the methyl cellulose suspensions of this invention are obtained by dissolving in water a sufficient quantity of a monosaccharide such as dextrose (glucose), levulose, galactose, sorbose and the like, a disaccharide such as sucrose, lactose, maltose and the like or mixtures thereof with glucose being preferred. In certain modifications of this invention a portion of the saccharide may be replaced by an edible polyhydroxy alcohol such as glycerine or propylene glycol. In other modifications the polyhydroxy alcohol as well as other ingredients such as organic acids, for example citric and benzoic acid, colors, flavors and medicinal agents such as pectin, phenolphthalein, senna, magnesium oxide, cascara sagrada and the like may be present in addition to the amount of saccharide required to prepare a suitable suspension.

The minimum and critical amount of monosaccharide, disaccharide or mixtures thereof that can so reduce the solubility of methyl cellulose in water as to make possible the achievement of the objects of this invention varies with the particular saccharide or mixtures of saccharides used, with glucose having been found to be most effective. When glucose alone is used at least sixteen percent on an anhydrous basis (twenty percent of liquid glucose U. S. P. XIV) is required to reduce the solubility of methyl cellulose in water to the point where a product containing about twenty percent methyl cellulose and having a viscosity of less than 1500 centipoises can be obtained. A preparation containing:

|  | Grams |
| --- | --- |
| Methyl cellulose, 100 cps., micronized | 100 |
| Liquid glucose, U. S. P. XIV | 100 |
| Water, q. s. 500 ml | 405 | has a viscosity of 800 centipoises and is suitable for use in achieving the objects of this invention. This viscosity is about that expected of a 3.5 percent colloidal solution of methyl cellulose in water and is much less than the more than 30,000 centipoise viscosity, along with gel formation, that would be predicted for a composition containing 100 grams of methyl cellulose 100 cps. and 405 grams of water.

Reduction of the liquid glucose in the above formula to fifteen percent, gives a product having the composition:

|  | Grams |
| --- | --- |
| Methyl cellulose micronized, 100 cps | 100 |
| Liquid glucose, U. S. P. XIV | 75 |
| Water, q. s. 500 ml. | 430 | which has a viscosity of above 2000 centipoises and is not suitable in achieving the objects of this invention as it is much too thick to pour from an ordinary small-necked bottle. A product having the same viscosity can be obtained by adding a small amount of water to the previously mentioned formula containing 100 grams (20 percent) of liquid glucose.

When the quantity of glucose is increased, as in the following formula:

| | | |
|---|---|---|
| Methyl cellulose, 100 cps., micronized | grams | 100 |
| Dextrose, C. P. anhydrous | do | 175 |
| Water, q. s. 500 ml | ml | 335 | the resulting product has a viscosity of 65 centipoises which is that of about a 1.75 percent colloidal water solution of 100 cps. methyl cellulose. When 175 grams of liquid glucose replaced the anhydrous dextrose in the above formula the product had a viscosity of 180 centipoises. Levulose gives similar but not identical results.

The above data shows that glucose can be utilized in the anhydrous form or as a concentrated solution. Concentrated aqueous solutions of glucose are commercially available under the designations corn syrup or liquid glucose. Such commercial products usually contain at least eighty percent glucose as required by the United States Pharmacopoeia XIV for liquid glucose. However more concentrated or more dilute solutions can be used in compounding the products of this invention as is readily apparent. In order to make more definite the amount of glucose used, the formulas herein given are based upon liquid glucose U. S. P. XIV which contains at least eighty percent glucose. When more dilute glucose solutions are used the volume used should be that calculated to contain the amount of glucose present in the weight of liquid glucose U. S. P. given in the formulae. These remarks likewise apply to the glycerine used with the quantity of glycerine given in the formulae referring to U. S. P. glycerine which contains about 95 percent glycerine and five percent water.

The replacement of glucose by sucrose requires a much more concentrated solution as is shown by a product having the formula:

| | Grams |
|---|---|
| Methyl cellulose, 100 cps, micronized | 100 |
| Sucrose | 300 |
| Water, q. s. to give 500 ml. | | which is sufficiently fluid to pour slowly from a narrow-necked bottle, while a product containing 250 grams of sucrose is not suitable for use. However a product containing both glucose and sucrose such as one having the following formula:

| | | |
|---|---|---|
| Methyl cellulose, 100 cps., micronized | grams | 100 |
| Sucrose | do | 150 |
| Liquid glucose, U. S. P. XIV | do | 25 |
| Water, q. s. 500 ml | ml | 365 | which has a viscosity of 133 centipoises is suitable for use. Increasing the liquid glucose content to fifty grams and lowering the sucrose content to 125 grams gives a product having a viscosity of eighty centipoises. Additional experimental data indicates that when glucose and sucrose are used in combination the total concentration of sugar must be at least 30–35 percent weight/volume of which at least five percent must be glucose, the remaining 25–30 percent being sucrose.

Glycerine or propylene glycol alone are not very helpful in forming methyl cellulose suspensions as a great quantity is required as is shown by a product having the following formula:

| | | |
|---|---|---|
| Methyl cellulose, 100 cps., micronized | grams | 100 |
| Glycerine | ml | 375 |
| Water (to give 500 ml.) | ml | 100 | which is sufficiently fluid to pour but is not otherwise suitable for oral administration. Reduction in the amount of glycerine from eighty percent, as above, to about sixty percent gives a product which is not sufficiently fluid for use. Substitution of propylene glycol for glycerine in the above formula gives similar results.

However glycerine can in part replace either glucose or sucrose as is shown by the following formulae:

| | | |
|---|---|---|
| Methyl cellulose, 100 cps | grams | 100 |
| Glycerine | ml | 125 |
| Liquid glucose | grams | 50 |
| Water (to give 500 ml.) | ml | 315 | whose viscosity is 133 centipoises, and

| | | |
|---|---|---|
| Methyl cellulose, 15 cps | grams | 100 |
| Glycerine | ml | 50 |
| Liquid glucose | grams | 50 |
| Sucrose | do | 50 |
| Water (to give 500 ml.). | | | whose viscosity is 1700 centipoises, and

| | | |
|---|---|---|
| Methyl cellulose, 1500 cps | grams | 50 |
| Glycerine | ml | 75 |
| Liquid glucose | grams | 50 |
| Sucrose | do | 50 |
| Water (to give 500 ml.) | ml | 350 | whose viscosity is 53 centipoises. These formulas indicate that the combined percentage of glycerine and glucose or glycerine, glucose and sucrose must be about 35 percent weight/volume of the suspension of which at least ten percent must be glucose. This is further apparent since a composition having the formula:

| | | |
|---|---|---|
| Methyl cellulose, 100 cps | grams | 100 |
| Glycerine | ml | 25 |
| Liquid glucose | grams | 25 |
| Sucrose | do | 25 |
| Water (to give 500 ml.) | ml | 425 | forms a viscous gel.

Among the other sugars which have been found useful is maltose as shown by the following formula:

| | | |
|---|---|---|
| Methyl cellulose, 100 cps | grams | 100 |
| Malt-extract (non-diastatic) | do | 175 |
| Water (to give 500 ml.) | ml | 335 | which has a viscosity of 530 centipoises. Substitution of the maltose by sorbose required slightly more sorbose before a satisfactory suspension could be obtained.

In addition to providing a vehicle in which methyl cellulose is insoluble, preferred modifications of the products of this invention require that the methyl cellulose neither rise to the top or sink to the bottom of a container to any significant extent upon prolonged standing. This can be accomplished by adjusting the concentration of the components of the suspension so that the specific gravity of the vehicle is about that of the methyl cellulose used. A preferred formula which accomplishes this result is:

| | | |
|---|---|---|
| Methyl cellulose, 100 cps | grams | 100 |
| Glycerine | ml | 75 |
| Liquid glucose | grams | 175–200 |
| Sucrose | do | 100 |
| Benzoic acid | do | 0.5 |
| Citric acid | do | 1.75 |
| Water, q. s. to give a volume of 500 ml. | | |

Other formulae having an increased sucrose and a lower glucose content will achieve the same result but such suspensions have too sweet a taste for oral administration. Also, for reasons of palatability glycerine is preferred to propylene glycol.

In addition to the above ingredients certified edible colors and flavors can be added as found desirable by those skilled in the pharmaceutical art.

The products of this invention can be prepared in a number of ways. For example a product having the formula:

| | | |
|---|---|---|
| Methyl cellulose, 1500 cps., micronized | grams | 100 |
| Glycerine | ml | 150 |
| Liquid glucose, U. S. P. XIV | grams | 250 |
| Sucrose | do | 250 |
| Benzoic acid | do | 1 |
| Citric acid | do | 3.5 |
| Color and flavor | | Q.s. |
| Water to make 1 liter | ml | 450 | can be prepared as follows:

The liquid glucose, sucrose, citric acid and dye are dissolved in water. The benzoic acid is dissolved in the glycerine and the methyl cellulose added thereto with stirring, until a homogeneous mass is obtained. The methyl cellulose-glycerine-benzoic acid mixture is added gradually to the syrup with stirring. The flavoring oils are then added and the suspension stirred until uniform. The suspension, after packaging and labeling, is ready for use.

Alternatively the ingredients can be added one at a time to the water, the methyl cellulose being added last. When this procedure is used much air may become incorporated in the suspension so that it may be desirable to subject the product to reduced pressure, using procedures and equipment known to the art, in order to remove the entrapped air prior to packaging. This alternative procedure while inconvenient for the preparation of small quantities can be used for the manufacture of commercial quantities as the required mixing and vacuum equipment are standard in the art of pharmaceutical manufacture.

The preparation of the suspension without the incorporation of such quantities of air that the use of vacuum equipment is required for its removal is accomplished by incorporating into the water, before the addition of the methyl cellulose, about 0.01 percent of a polyalkylene sorbitan trioleate having 85 polyoxyalkylene groups (Tween 85, Atlas Powder Co., Wilmington, Del.). This small quantity of material so materially aids in the escape of the air usually trapped in the suspension by the methyl cellulose that its use is preferred in the preparation of the suspensions of this invention.

As previously mentioned the viscosity of a methyl cellulose suspension; upon the portion-wise addition of water thereto, first increases and then decreases. When a methyl cellulose suspension was prepared as described previously using:

| | | |
|---|---|---|
| Methyl cellulose, 100 cps., micronized | grams | 200 |
| Glycerine | ml | 150 |
| Liquid glucose, U. S. P. XIV | grams | 350 |
| Sucrose | do | 200 |
| Benzoic acid | do | 1.0 |
| Citric acid | do | 3.5 |
| Flavor and color | | Q. s. |
| Water (to make 1 liter) | ml | 400 | it was found to have a viscosity of 266 centipoises (Brookfield). The effect on the viscosity of this suspension of the addition thereto of various amounts of water is shown in the following table.

Table

| Volume of Suspension, ml. | Water Added, milliliters | Viscosity, Centipoises |
|---|---|---|
| 50 | 0 | 266 |
| 50 | 200 | 2,100 |
| 50 | 283 | 420 |
| 50 | 335 | 320 |
| 50 | 260 | 260 |

The suspensions of this invention are also useful as vehicles for medicinal agents as illustrated by the following formulations:

| | | |
|---|---|---|
| Methyl cellulose, 100 cps | grams | 100 |
| Liquid glucose | do | 175 |
| Sucrose | do | 100 |
| Glycerine | ml | 75 |
| Pectin | grams | 1.0 |
| Water, q. s | ml | 500 |

This suspension had a viscosity of about 860 centipoises which is considerably higher than that of a formulation without the pectin.

A suspension containing:

| | | |
|---|---|---|
| Methyl cellulose | grams | 200 |
| Liquid glucose, U. S. P. XIV | do | 400 |
| Sucrose | do | 200 |
| Glycerine | ml | 150 |
| Fluid extract cascara | ml | 50–100 |
| Benzoic acid | grams | 1.0 |
| Citric acid | do | 1.75 |
| Tween 85 | do | 0.1 |
| Color and flavor | | Q. s. |
| Water (to make 1 liter) | ml | 300–350 | had a viscosity about the same as the formula without the cascara and was suitable for use.

When prepared in a like manner a formulation as above in which the fluid extract cascara was replaced by 4–6 grams of phenolphthalein had a satisfactory viscosity but a bitter taste due to the phenolphthalein.

The above described modifications of the products and methods are subject to such modifications and variations as are apparent to those skilled in the art to which this invention pertains without departing from the spirit and scope thereof.

This application is a continuation-in-part of application Serial No. 178,757 filed August 10, 1950, now abandoned.

Having thus described my invention I claim:

1. A method for the preparation of water suspensions of methyl cellulose having a water to methyl cellulose ratio of from one to nine, comprising mixing methyl cellulose, water, and at least one member of the group consisting of monosaccharides and disaccharides in an amount equivalent to at least sixteen percent weight/volume of glucose based on the final volume of said suspension.

2. A method for the preparation of water suspensions of methyl cellulose having a water to methyl cellulose ratio of from one to nine, comprising mixing methyl cellulose, water and at least one member of the group consisting of monosaccharides and disaccharides in an amount equivalent to at least sixteen percent weight/volume of glucose based on the final volume of said suspension followed by subjecting the suspension to reduced pressure to remove air incorporated during the mixing.

3. A method for the preparation of water suspensions of methyl cellulose having a water to methyl cellulose ratio of from one to nine comprising mixing methyl cellulose, water in which is dissolved about 0.01 percent of a polyoxyalkylene sorbitan trioleate having 85 polyoxyalkylene groups and at least one member of the group consisting of monosaccharides and disaccharides in an amount equivalent to at least sixteen percent weight/volume of glucose based on the final volume of said suspension.

4. A method for the preparation of a water suspension of methyl cellulose comprising mixing water, methyl cellulose and glucose in the proportions to give at least 100 grams of methyl cellulose per liter of suspension and at least 160 grams of glucose per liter of suspension followed by subjecting the suspension to reduced pressure to remove air incorporated during the mixing.

5. A method for the preparation of a water suspension of methyl cellulose having a water to methyl cellulose ratio of from one to nine, comprising mixing methyl cellulose, water containing about 0.01 percent of a polyoxyalkylene sorbitan trioleate having about 85 polyoxyalkylene groups and at least 160 grams of glucose per liter of suspension.

6. A water suspension of methyl cellulose comprising finely divided methyl cellulose one part, water from one to nine parts and at least one member of the group consisting of monosaccharides, and disaccharides in an amount equivalent to at least sixteen percent weight/volume of glucose based on the final volume of the suspension, said suspension being characterized by the presence of undissolved methyl cellulose, the absence of gel formation, a viscosity which is substantially less than that of a colloidal solution having the same concentration of methyl cellulose per unit volume and that the viscosity of the suspension is increased by the addition thereto of water.

7. A methyl cellulose product containing finely divided solid, undissolved methyl cellulose dispersed in an aqueous glucose containing solution comprising:

| | Grams |
|---|---|
| Methyl cellulose, 100 cps., micronized | 200 |
| Liquid glucose, U. S. P., at least | 100 |
| Water, at least 200 grams, q. s. to make 1 liter. | | characterized by having a viscosity below about 1500 centipoises which is substantially less than a colloidal water solution having the same concentration of methyl cellulose per unit volume.

8. A water suspension of methyl cellulose containing solid, finely divided, undissolved methyl cellulose dispersed in a water solution comprising:

| | Grams |
|---|---|
| Methyl cellulose | 200 |
| Liquid glucose, at least | 100 |
| Sucrose, at least | 100 |
| Glycerine, at least | 150 |
| Water, at least 200 grams, q. s. to make 1 liter. | | characterized by having a viscosity below about 1500 centipoises which is substantially less than a colloidal water solution having the same concentration of methyl cellulose per unit volume.

9. A water suspension of methyl cellulose comprising:

| | | |
|---|---|---|
| Methyl cellulose | grams | 200 |
| Glycerine | ml | 150 |
| Liquid glucose, U. S. P. XIV | grams | 400 |
| Sucrose | do | 200 |
| Benzoic acid | do | 1.0 |

| | | |
|---|---|---|
| Citric acid | do | 1.75 |
| Color and flavor | | Q. s. |
| Water (to make 1 liter) | ml | 400 | characterized by having a viscosity of less than about 1500 centipoises.

10. The product of claim 9 containing in addition a purgative.

11. The product of claim 10 wherein the purgative is phenolphthalein.

12. A water suspension of methyl cellulose containing solid, finely divided, undissolved methyl cellulose dispersed in a water solution comprising:

| | Grams |
|---|---|
| Methyl cellulose | 200 |
| Liquid glucose, at least | 50 |
| Sucrose, at least | 300 |
| Water, q. s. to make 1 liter. | | characterized by having a viscosity below about 1500 centipoises which is substantially less than a colloidal water solution having the same concentration of methyl cellulose per unit volume.

References Cited in the file of this patent

UNITED STATES PATENTS

| | | |
|---|---|---|
| 2,085,733 | Bird | July 6, 1937 |
| 2,350,161 | Gloor | May 30, 1944 |
| 2,362,761 | Medl | Nov. 14, 1944 |
| 2,410,110 | Taylor | Oct. 29, 1946 |

FOREIGN PATENTS

| | | |
|---|---|---|
| 376,796 | Great Britain | July 11, 1932 |
| 468,769 | Great Britain | Oct. 3, 1935 |
| 430,960 | Great Britain | June 27, 1935 |

OTHER REFERENCES

Atlas Surface Active Agents, Atlas Powder Co. Industrial Chemicals Dept., Wilmington 99, Delaware (1948), pages 4, 5, 38, and Table I (between pages 26 and 27).

Pharmaceutical Formulas, vol. 2, 11th ed. (1944), pages 542 to 544.

Bergy: American Professional Pharmacist, December 1939, pages 691 to 694.

U. S. Dispensatory, 24th ed. (1947), page 145.

Pharmaceutical Recipe Book, 3rd ed. (1943), page 248.

Dultz: "Tylose als Ausweichstoff," Deutsche Apotheker-Zeitung, vol. 55, No. 69, August 28, 1940, pages 524 to 526, especially at page 525.